United States Patent [19]

van der Lely

[11] Patent Number: 4,537,262

[45] Date of Patent: Aug. 27, 1985

[54] SOIL CULTIVATION

[76] Inventor: Cornelis van der Lely, 7 Brüschenrain, Zug, Switzerland

[21] Appl. No.: 504,414

[22] Filed: Jun. 15, 1983

[30] Foreign Application Priority Data

Jun. 23, 1982 [NL] Netherlands .......................... 8202530

[51] Int. Cl.³ .............................................. A01B 49/02
[52] U.S. Cl. .................................... 172/146; 172/151; 172/140; 172/520; 172/552; 172/657; 172/460; 172/504
[58] Field of Search ................ 172/145, 146, 147, 148, 172/149, 150, 151, 552, 553, 520, 448, 140, 142, 69

[56] References Cited

U.S. PATENT DOCUMENTS

| | | | |
|---|---|---|---|
| 876,951 | 1/1908 | Dollison | 172/151 X |
| 966,890 | 8/1910 | Donnelly | 172/520 X |
| 1,088,075 | 2/1914 | Johnson | 172/146 X |
| 2,035,591 | 3/1936 | Childs | 172/147 |
| 2,042,981 | 6/1936 | Bishop | 172/553 |
| 3,209,841 | 10/1965 | Van der Lely | 172/711 |
| 3,532,169 | 10/1970 | Van der Lely | 172/32 |
| 3,935,906 | 2/1976 | Neal | 172/552 |
| 3,937,285 | 2/1976 | Van der Lely | 172/52 |
| 3,945,441 | 3/1976 | Van der Lely | 172/43 |
| 3,977,476 | 8/1976 | Van der Lely | 172/51 |
| 4,077,477 | 3/1978 | Van der Lely | 172/114 |
| 4,088,083 | 5/1978 | Dail, Jr. et al. | 111/13 |
| 4,091,878 | 5/1978 | Steketee | 172/147 |
| 4,109,731 | 8/1978 | Van der Lely | 172/59 |
| 4,111,264 | 9/1978 | Van der Lely | 172/59 |
| 4,113,024 | 9/1978 | Van der Lely et al. | 172/59 |
| 4,136,745 | 1/1979 | Van der Lely | 172/63 |
| 4,280,564 | 7/1981 | Lely | 172/151 |
| 4,315,547 | 2/1982 | Rau | 172/146 |
| 4,340,118 | 7/1982 | Van der Lely | 172/49.5 |
| 4,361,191 | 11/1982 | Landoll | 172/151 |
| 4,403,662 | 9/1983 | Dietrich | 172/196 |

FOREIGN PATENT DOCUMENTS 24168 8/1950 Finland .............................. 172/69

Primary Examiner—Richard J. Johnson
Attorney, Agent, or Firm—Penrose Lucas Albright

[57] ABSTRACT

A soil cultivating machine comprises two transverse rows of fixed tines and three transversely extending rollers. The front roller has discs which cut parallel slits in the soil. The two following rollers have transversely extending releasable blades mounted on angle-irons which form shallow V's pointed in the direction of the rollers' rotation and which are twisted about 90° from their outboard ends to their centers. The rollers are drivingly interconnected by a chain transmission so that the middle roller rotates slower than the other two and the rear roller rotates faster than it would if freely rotating on the ground. The tines are in rows between the rollers and their depth of soil penetration relative to the underlying soil is adjustable. The rollers are mounted on a generally horizontal framework which is adjustable, however, so it can be inclined slightly either forward or aft to increase or decrease the penetration of the front roller's discs.

14 Claims, 2 Drawing Figures

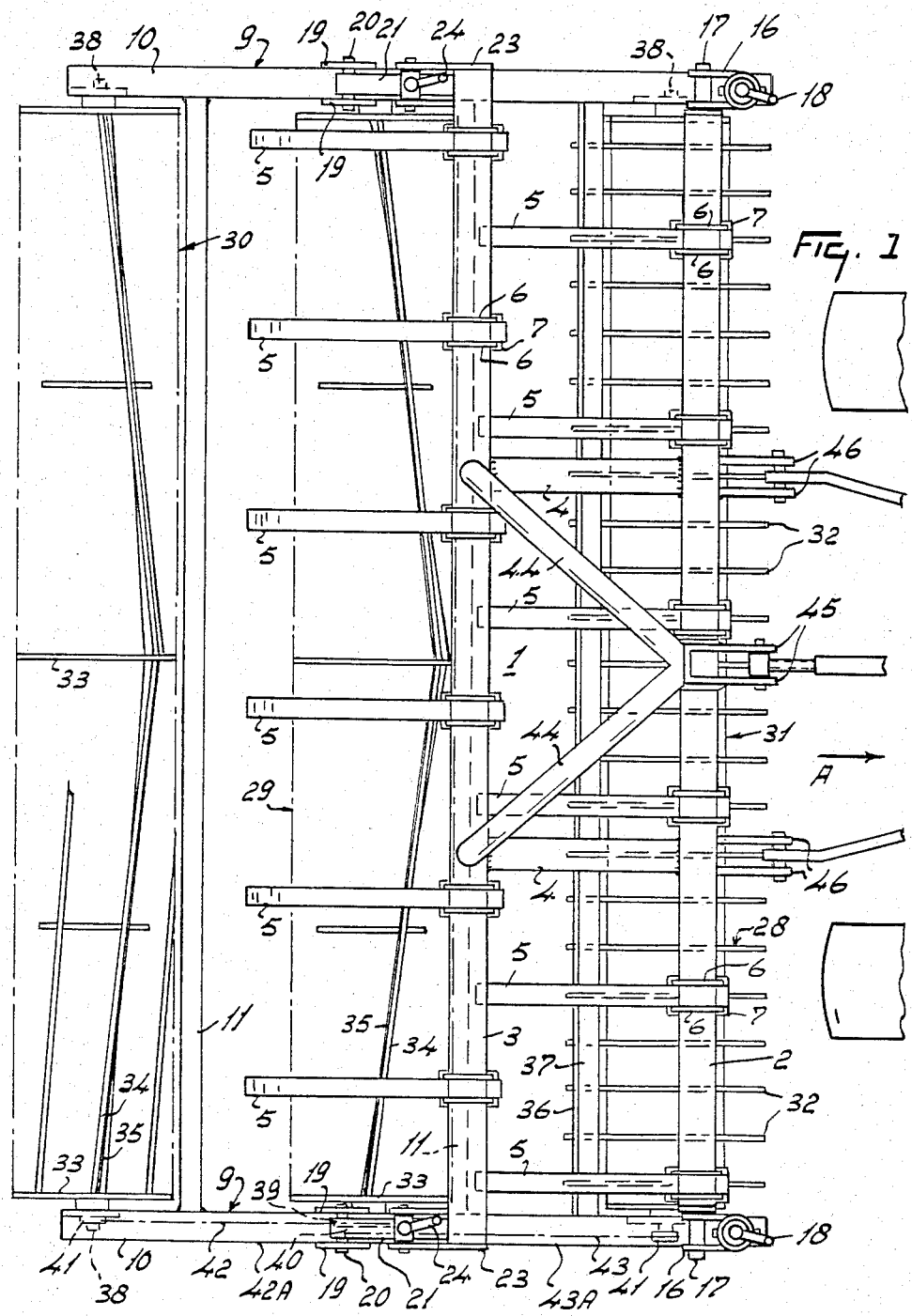

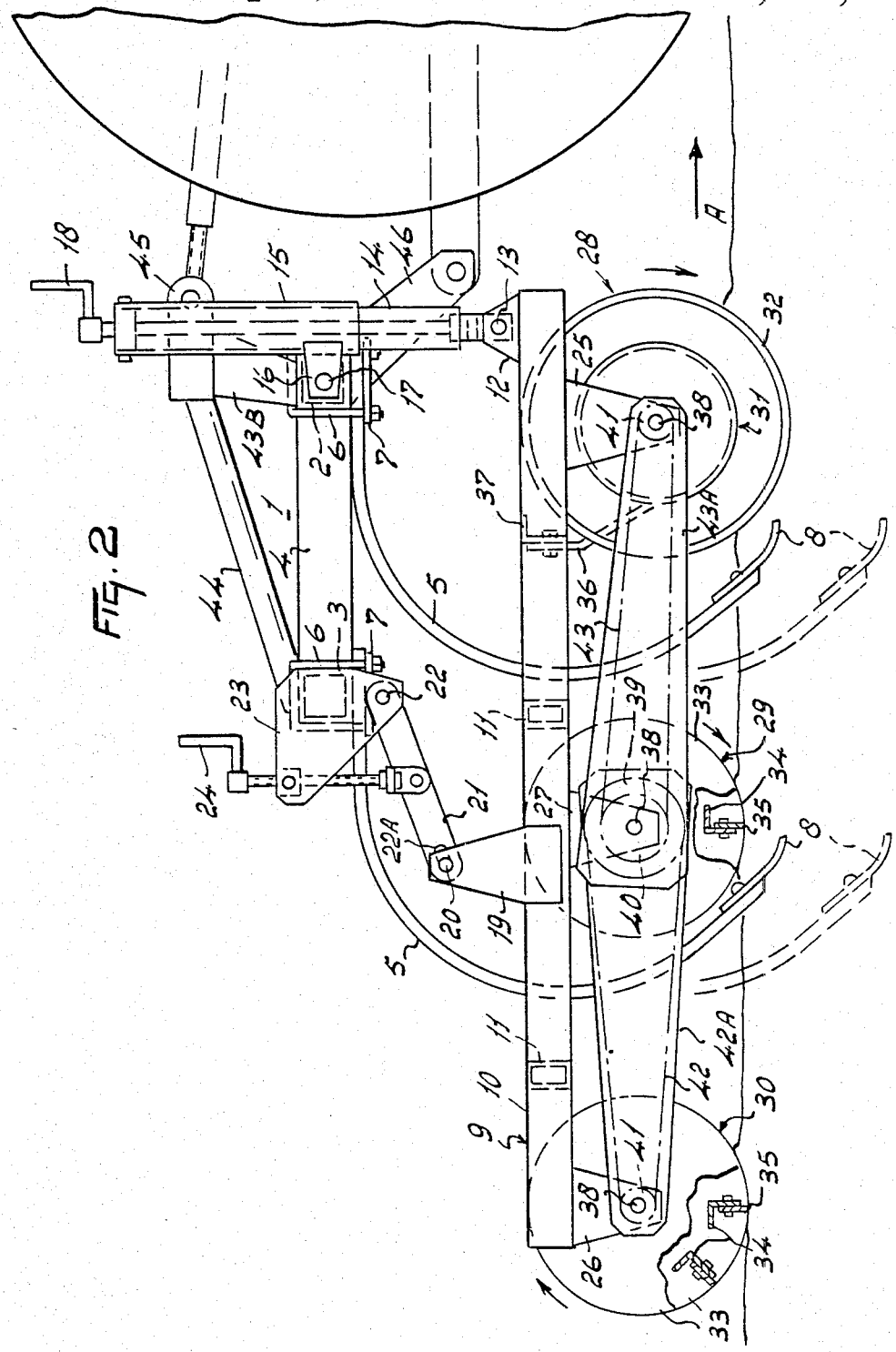

SOIL CULTIVATION

SUMMARY OF THE INVENTION

This invention relates to soil cultivation, and particularly, although not exclusively, to soil cultivating machines comprising a frame and a plurality of cultivating members arranged on the frame and including at least one roller.

In such machines, the roller is usually rotated by its ground contact during travel of the machine so that the ground is worked. The effect of the rotation of the roller on the ground is frequently not satisfactory on heavy soil.

According to one aspect of the present invention, there is provided a soil cultivating machine comprising a frame and a plurality of cultivating members arranged on the frame, the cultivating members comprising three rollers provided with cultivating elements, the rollers being drivably interconnected with each other during operation.

A machine in accordance with the present invention enables more intensive cultivation of the soil because the machine is provided with three rollers having cultivating elements, which rollers are in drivable engagement with one another during operation. In this way a drastic intensification of the soil cultivation is obtained with the aid of the rollers, while at the same time the machine's construction is not expensive.

According to a second aspect of the present invention there is provided a soil cultivating machine comprising a frame and a plurality of cultivating members arranged on the frame, the cultivating members comprising two rows of tines, extending transversely of the intended direction of normal travel of the machine, and three rollers provided with cultivating elements.

This construction permits of working the soil more deeply, and the cooperation of the rollers with each other and with the tines enable a satisfactory soil structure to be obtained to the desired depth.

According to a third aspect of the present invention there is provided a soil cultivating machine comprising a frame and a plurality of cultivating members arranged on the frame, one of the cultivating members comprising a roller provided with cultivating elements which are adapted to cut slits in the ground extending in the intended direction of operative travel of the machine, a further one of the cultivating members comprising a roller having cultivating elements which extend transversely of the intended direction of operative travel of the machine.

Such a construction permits working of the soil in two directions more or less at right angles to each other, so that the earth can be mixed to a degree such that soil structure desired for a seed bed is obtained even by these relatively simple means.

According to a fourth aspect of the present invention there is provided a method of cultivating the soil by means of a soil cultivating machine, the method comprising cutting a strip of soil in the direction of travel of the machine, after which a cultivation operation is carried out by blades which extend transversely of the direction of travel of the machine.

For a better understanding of the present invention and to show how it may be carried into effect, reference will now be made, by way of example, to the accompanying drawings, in which:

BRIEF DESCRIPTION OF THE DRAWINGS

FIG. 1 is a plan view of a soil cultivating machine; and

FIG. 2 is a side elevation of the machine illustrated in FIG. 1.

DESCRIPTION OF THE PREFERRED EMBODIMENT

The machine shown in the Figures is a soil cultivating machine comprising a frame having a framework 1. The framework 1 is formed by two parallel frame beams 2 and 3, which extend transversely of the intended direction A of operative travel of the machine and are located one behind the other with a space between them. At locations which are equal distances from the midpoints of the frame beams 2 and 3, the beams are interconnected by tie beams 4 extending in the direction A. Each of the beams 2 and 3 is provided with a plurality of cultivator tines 5, which extend, as viewed from the side, from their fastening area in a C-shaped manner. In this embodiment each beam has six cultivator tines, which are arranged—as will be apparent from FIG. 1—in a manner such that the cultivator tines on the front beam 2 work strips of soil located between the strips worked by the cultivator tines on the rear beam 3. The cultivator tines 5 are fastened to the beams 2 and 3 by brackets 6 and clamping plates 7. On the underside, each cultivator tine 5 is provided with a releasable blade 8, which extends mainly to the front.

The machine also comprises a carrying frame 9, which is located below the framework 1 and comprises two beams 10 extending in the direction A which are located in the same vertical plane as the ends of the frame beams 2 and 3. The length of the beams 10 is at least twice the length of the tie beams 4.

The beams 10 are connected with one another just in front of their midpoints and at a distance in front of their rear ends by beams 11 extending transversely of the direction A. Near its front end, each beam 10 is provided with a pair of lugs 12, between which an upwardly extending tube 14 is pivotally mounted by a pin 13. The tube 14 is slidably arranged in a tube 15. A lug 16 is fixed to the rear of the tube 15 near its lower end, and this lug is pivotally connected by a pin 17 with one end of the front frame beam 2. Inside the tubes 14 and 15 there is a screw spindle 18 which is arranged so that it can be operated to slide the tubes telescopically with respect to each other. Just behind its mid point each beam 10 is provided with a pair of lugs 19, between which an arm 21 is pivotally mounted by a pin 20. The arm 21 extends to the front away from the lugs 19. Relative movement to a limited extent is permitted between the pin 20 and the arm 21 because the pin 20 is received in a slot 22A in the arm 21, so that during operation limited movement of the carrying frame 9 is possible. At the other end, the arm 21 is retained by a pin 22 between two plates 23, which are fastened to the respective ends of the rear frame beam 3. To the rear, between the plates 23 and the middle of the arm 21, there is a screw spindle 24 which is pivotally arranged in a manner such that it can be operated to turn the arm 21.

Operation of the screw spindles 18 and 24 enables the carrying frame 9 to be displaced upwardly and downwardly with respect to the framework 1.

Each of the beams 10 of the carrying frame 9 is provided on its underside with three downwardly projecting lugs 25, 26 and 27. The front lug 25 is just behind the front end of the beam 10, the rear lug 26 is fastened at the rear end of the beam 10 and the middle lug 27 is substantially midway between the front and rear lugs. Between the lugs 25, 26 and 27 of each pair, rollers 28, 29 and 30 respectively are mounted for free rotation in bearings. The front roller 28 is ahead of the first row of cultivator tines 5 and the middle roller 29 is situated between the first and the second row of cultivator tines 5 (FIG. 2). From FIG. 2 it will be appreciated that the cultivator tines 5 are arcuate and the center of curvature of the tines 5 of the second row are at or near a vertical plane containing the axis of rotation of the roller 29. The center of curvature of the tines 5 of the first row are ahead of a vertical plane containing the rotary axis of the roller 30.

The front roller 28 comprises a tubular carrier 31 provided with disks 32, which are at least substantially parallel to a vertical plane extending in the direction A and which are equally spaced apart. The outermost disks 32 are spaced from the ends of the carrier 31. Each disk 32 is provided at its circumference with a cutting edge. The rollers 28 to 30 are disposed so that the rotary axis of the front roller 28 is at a slightly lower level than the rotary axes of the middle and rear rollers 29 and 30. The rotary axes of the rollers 29 and 30 are located at least substantially at the same height as each other. The two rollers 29 and 30 each have a plurality of support plates 33 (in this embodiment there are five) which are parallel to a vertical plane extending in the direction A. The support plates 33 are regularly spaced along the length of the roller and the outermost support plates are at the ends of the roller. Between each outermost support plate and the central support plate of each roller 29 and 30 there are equally spaced elongate carriers 34 which are arranged at the periphery of the roller, each carrier comprising a length of angle-iron which extends helically up to the middle support plate 33, a circumferential angle of about 45° being enclosed between the ends. The angle-iron of the roller 29 are arranged so that one limb extends at least substantially radially and the other limb trails with respect to the direction of rotation during operation. The corresponding limb of the angle-iron of the roller 30 projects forwardly with respect to the direction of rotation.

Each of the carriers 34 is furthermore twisted about its longitudinal axis through an angle of about 90°. The carriers 34 of the roller 29 are twisted in a direction opposite the direction in which the carriers 34 of the roller 30 are twisted.

On the two sides of the central support plate 33, the elongate elements 34 are arranged so that, as viewed on plan, they form a V, the apex of which, located near the central support plate 33, is directed to the front with respect to the direction of rotation imparted to the roller during operation (FIG. 1).

A blade 35 is releasably fitted to the radial limb of each of the carriers 34, this blade fully matching the angle-iron.

Behind the front roller 28 there are scrapers 36, which are mounted on a carrier 37 disposed between the beams 10. The scrapers 36 are forwardly and downwardly inclined from the carrier 37 and, approximately at the level of the rotary axis of the roller, they bear on the tubular carrier 31. At one end, each of the rollers 28 to 30 is provided with a prolonged stub shaft 38. The stub shaft 38 of the middle roller 29 is provided with two adjacent sprockets 39 and 40 and the stub shaft 38 of the front roller 28 and that of the rear roller 30 are each provided with a sprocket 41. The sprockets 41 of the stub shafts 38 of the front and the rear rollers are identical to each other, but the inner sprocket 39 on the stub shaft 38 of the middle roller 29 has a larger diameter than the outer sprocket 40. The ratio between the diameters is three to two. The larger sprocket 39 is connected by a chain 42 with the sprocket 41 on the stub shaft 38 of the rear roller 30, and the smaller sprocket 40 on the stub shaft 38 of the middle roller 29 is connected by a chain 43 with the sprocket 41 on the stub shaft 38 of the front roller 28. Thus a differential relative drive of the rollers can be obtained during operation, in which the transmission ratio between the front roller 28 and the middle roller 29 is one to two and that between the middle roller 29 and the rear roller 30 is three to one. The respective chain transmissions are each surrounded by a protective casing 42A and 43A respectively.

Near the center the leading frame beam 2 of the framework 4 is provided with an upwardly extending support 43B, the top of which is connected by diverging supports 44 with the trailing frame beam 3. At the top the upwardly extending support 43B is provided with spaced tags 45, between which can be arranged the end of the top arm of the three-point lifting device of a tractor. On the lower side the frame beam 2 is provided at equal distances from the support 43B with downwardly and forwardly inclined pairs of tags 46, between which can be arranged the respective lower arms of the three-point lifting device of the tractor.

For operation, the machine is coupled to the three-point lifting device of a tractor using the coupling means formed by the pairs of tags 45 and 46. The tractor draws the machine in the direction of the arrow A. Using the screw spindles 18 and 24, the carrying frame 9, on which the rollers 28 and 30 are mounted, is adjusted to set the working depth of the cultivator tines 5. During travel of the machine, the relatively spaced disks 32 of the front roller 28 cuts slits in the ground and are driven in rotation by ground contact. This rotation is transmitted to the middle roller 29 through the chain transmission (41, 43, 40). The speed of rotation of the middle roller 29 is lower than that of the front roller 28, which results in a dragging movement of the carriers 34 and of the blades 35 arranged thereon, the cultivation thus carried out providing, over the width of the machine, a homogeneous distribution of the soil worked by the disks 32 of the front roller 28 and the tines 5. Since—as will be appreciated from FIG. 2—the peripheries of the rollers 28 and 29 are located very close to the fronts of the tines 5, a cooperative effect can be achieved between the rear of the rollers 28 and 30 and the tines.

During operation the rear roller 30 is driven through the chain transmission (39, 42, 41) with a circumferential speed exceeding that of the middle roller 29 so that the elongate elements of the rear roller tend to slip relative to the ground so that by the angle-irons forming a kind of blade and by the blades 35 this roller effects a final levelling and crumbling effect. In the levelling effect aimed at the torsional shape and the V-shaped disposition of the carriers 34 also play a part. Thus, the rear roller 30 can laterally displace earth in a direction opposite the direction in which the roller 29 tends to displace the earth laterally. The respective rollers constitute rotatable cultivating members provided with working elements formed by the carriers 34 and the releasable blades 35. If under given conditions the blades 35 are not required, they can be removed. The easy removal permits effective sharpening of the blades. The cultivator tines 5 constitute fixed working members.

The depth-setting means formed by the rollers 28 to 30 in front of the cultivator tines 5 permit of carrying out a preliminary cultivation and then a levelling and crumbling post-cultivation.

The use of the blades 35 is dependent on the prevailing conditions. It will, for example, be preferred to remove the blades if a smearing effect is likely to occur. On the contrary, if there is much weed, it will be preferred to leave the blades on the roller.

Although various features of the cultivating machine described and illustrated in the drawings, will be set forth in the following claims as inventive features, it is to be noted that the invention is not necessarily limited to these features and is intended to encompass all novel inventive features that have been disclosed both individually and in various combinations.

Having described my invention, what I claim as new and to be secured by Letters Patent of the United States is:

1. A soil cultivating machine comprising a carrying frame and a plurality of cultivating members arranged on said frame, said cultivating members comprising three rollers arranged in series transverse to the machine's direction of travel during operations, said rollers being provided with cultivating elements and being drivably interconnected with each other during operation, the machine further comprising a framework and further cultivating members, said framework supporting said further cultivating members, said rollers being mounted on said carrying frame, said framework being adjustably connected to said carrying frame by two independently operable height adjustment means at two respective horizontally spaced apart locations so that said carrying frame and said rollers mounted thereon are movable as a whole relatively upwardly and downwardly with respect to said framework to which said further cultivating members are fastened, said rollers serving to establish the working depth of said further cultivating members.

2. A soil cultivating machine as claimed in claim 1, in which said further cultivating members comprise at least one row of tines connected adjacent one of said height adjustment means, at least one of said rollers being disposed in front of said row of tines with respect to said direction of travel, said one row of tines extending into the soil under said one roller during cultivating operations.

3. A soil cultivating machine as claimed in claim 2, in which the rear side of one of said rollers is directly adjacent said tines.

4. A soil cultivating machine as claimed in claim 1, in which said rollers are each provided at one end with a sprocket, said respecitve sprockets being interconnected by chain means for rotating same at relatively different rotational speeds.

5. A soil cultivating machine as claimed in claim 4, in which the transmission ratio between the front and middle said rollers is one to two and the transmission ratio between the middle and the rear said rollers is three to one.

6. A soil cultivating machine as claimed in claim 1, in which, with respect to said direction, the first of said rollers is disposed ahead of the front said row of tines and the second of said rollers is disposed ahead of the rearmost said row of tines.

7. A soil cultivating machine as claimed in claim 6, in which said cultivating elements of said first roller are adapted to cut slits in the ground, said cultivating elements of said second roller extend transversely of said direction.

8. A soil cultivating machine as claimed in claim 1, in which said cultivating elements of at least one said roller comprise a longitudinally extending carrier fabricated from angle iron, one limb of which extends substantially radially and the other limb of which extends substantially tangentially with respect to the rotary axis of said one roller.

9. A soil cultivating machine as claimed in claim 8 wherein said carriers are disposed in pairs extending one to each side of the center of said one roller and arranged in the form of a V so the V's vertex is situated near the center of said one roller and is directed forward with respect to the direction of rotation of said one roller during the machine's normal operations.

10. A soil cultivating machine as claimed in claim 9, in which at least one of said carriers is twisted about its longitudinal axis.

11. A soil cultivating machine as claimed in claim 8, in which said carriers of said one roller and like carriers of an adjacent said roller, which are consecutive rollers, are twisted about their respective longitudinal axes in opposite directions.

12. A soil cultivating machine as claimed in claim 1, in which said further cultivating members are provided with releasable blades.

13. A soil cultivating machine as claimed in claim 1, in which said roller's cultivating elements comprise disks which are arranged side by side and are substantially parallel to a vertical plane extending in said direction.

14. A soil cultivating machine comprising a frame and a plurality of cultivating members arranged on said frame, said cultivating members comprising at least two rollers arranged transverse to the machine's direction of travel during operation, said cultivating members including at least two rows of cultivating tools connected to extend downwardly from said frame, said frame including a carrier frame, at least one of said rollers being disposed in front of said rows of cultivating tools with respect to said direction of travel and at least a further said roller of said rows disposed to the rear of said cultivating tools for levelling and crumbling the soil worked by said cultivating tools, wherein said rollers are drivably interconnected with each other during operation and supported by means of said carrier frame, said latter frame being in spaced apart locations pivotally connected to a portion of said frame, and means inte........ carrier frame for ........ def ........